Aug. 20, 1929.  W. NOBLE  1,725,737
STEERING GEAR
Filed Aug. 6, 1928    2 Sheets-Sheet 1

Inventor
Warren Noble
By Stanley Lightfoot
Attorney

Aug. 20, 1929.  W. NOBLE  1,725,737
STEERING GEAR
Filed Aug. 6, 1928   2 Sheets-Sheet 2

Inventor
Warren Noble.

By Stanley Lightfoot
Attorney

Patented Aug. 20, 1929.

1,725,737

UNITED STATES PATENT OFFICE.

WARREN NOBLE, OF DETROIT, MICHIGAN.

STEERING GEAR.

Application filed August 6, 1928. Serial No. 297,849.

This invention relates primarily to steering gears although it is applicable in principle also to other devices wherein rotary or oscillatory motion is to be transmitted at an angle to the axis of rotation of a prime mover, it being, generally speaking, a substitute mechanism for a worm and sector drive.

Simplicity of construction and assembly, and ease of operation are characteristics of the invention, further objects being also to provide for a readily obtained nicety of adjustment of the cooperating parts, and a minimum of friction and lost motion therein.

The invention also contemplates a bearing arranged in the device which lends itself to ample lubrication and adequate support of the driven shaft, and also a form of casing which provides for rigid support against tilting in a cradling structure as will be hereinafter explained.

Still further it is an object of the invention to provide for a thrust adjustment in the arm of the driven member which cooperates with the driving worm whereby a self-adjusting function is introduced which results in the engaging member of the said arm adapting itself to the direction of drive of the worm for minimized frictional contact therewith as will more fully appear from the description of the example which follows.

Still further objects and advantages subsidiary to or resulting from the aforesaid objects, or from the construction or operation of the invention as it may be carried into effect, will become apparent as the said invention is hereinafter further disclosed.

In carrying the said invention into effect, I may provide a casing having mounted therein driving and driven shafts transversely disposed in spaced planes, the driving shaft carrying a worm and the driven shaft an arm engaging said worm through the medium of a rotatable engaging member, said arm having an angular swing of, say, ninety degrees and said engaging member approaching the axis of said driving shaft in the intermediate portion of its swing. The worm is of a generated form with its depth decreasing towards its ends, in counterpart of the paths of said engaging member in its swinging movement towards and from the axis of said driving shaft. The driven shaft is mounted in spaced bearings, one of which is adjacent the arm and directly beneath the worm, assuming that the device is held in such position that the worm passes above the shaft and this driven shaft is capable of slight end play against the resistance of a suitably disposed spring whereby this spring through the medium of the arm urges the rotatable engaging member into the groove of the worm thread but admits of a slight disengaging movement of the said member when power is applied to the worm for effecting movement of the arm. In this way the required rolling contact between the member and the worm on either side of the groove of the worm is maintained according to the direction of worm-rotation and friction relief is afforded on the opposite side wall of the groove.

All of which is more particularly described and ascertained hereinafter, by way of example, having reference to the accompanying drawings, wherein.

Similar characters of reference indicate similar parts in the several figures of the drawings.

Figure 1:
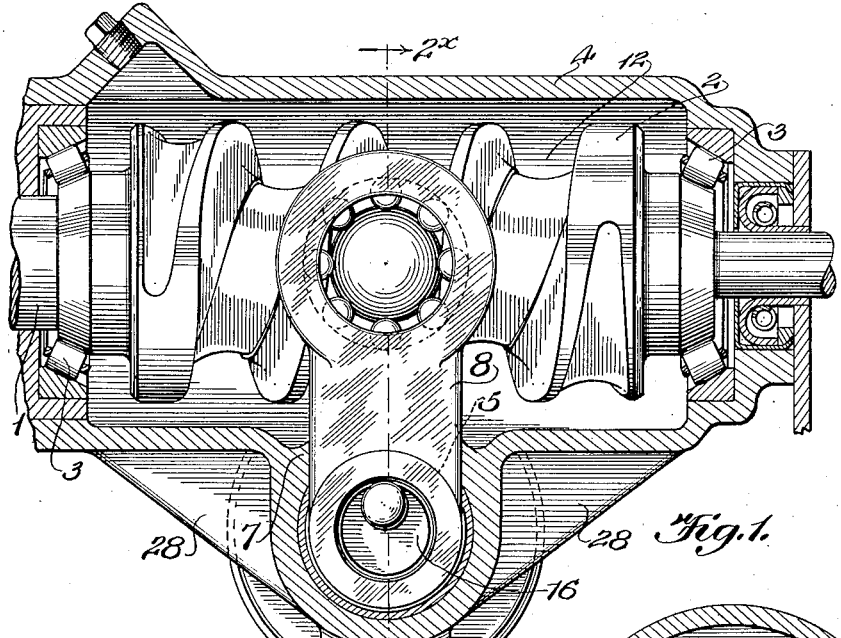
Figure 1 is an elevation of the steering gear with its casing shown in section in a plane through the axis of the steering column.
Figure 2:
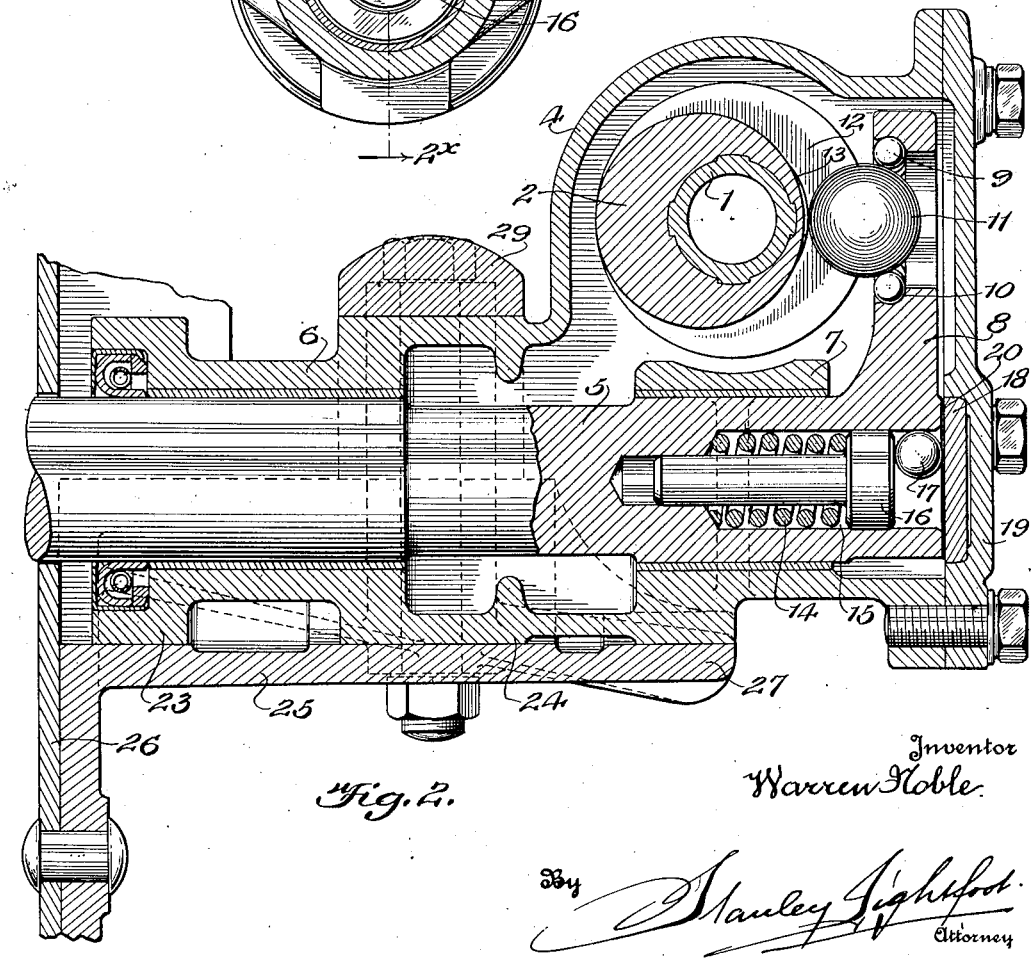
Figure 2 is a transverse section of the same taken on the line $2^x$—$2^x$ of Figure 1.

1 indicates the shaft of a steering column or gear operating member in which is mounted a worm 2, the whole being rotated and supported by bearings 3 in a casing 4 of suitable form. Passing beneath the said worm with its axis transverse to the axis of the worm is a driven shaft 5 extending through lateral extension 6 of the casing, which lateral extension forms a bearing for the shaft, and a further bearing 7 is formed in the said casing beneath the worm, so that the shell of the bearing passes between the worm and the said driven shaft, and the bearings 6 and 7 are spaced apart around the shaft, forming an adequate and rigid support therefor at the most advantageous points.

The end of the said shaft 5 is provided with an arm 8 extending upwardly over the face of the worm and carrying a ball bearing 9, comprising a circle of balls mounted in a race 10 formed in the said arm, this ball bearing in turn carrying a large ball 11 which constitutes a worm engaging member capable of rotation in any direction about its center in the bearing 9.

This worm engaging member 11 enters a corresponding thread 12 cut or formed in the worm 2, and preferably recessed as at 13 to provide clearance between the ball and the root of the thread.

It will be obvious that with the swinging of the arm 8 by the rotation of the worm and the consequent movement in one or other direction of the worm engaging member 11, the movement of the engaging member, if it remains seated in its bearing, will be in the path toward or from the axis of the worm due to the fact that the worm engaging member has an arcuate path, while the axis of the worm is a straight line, and in order to maintain proper relationship between the worm and the engaging member 11 throughout this movement, the thread 12 of the worm is decreased in depth from that point where the said engaging member most closely approaches the axis of the worm, the decreasing depth corresponding to the divergence of the path of the said member from the said axis so that one-third of the worm is in counter-part of the path of the member developed helically about the worm axis. In the example shown, the point of close approach of the engaging member 11 to the axis of the worm is intermediate of the length of the worm and therefore the thread decreases in depth from the center towards the ends of the worm as the arm 8 is in this case assigned to swing in both directions beyond the said point of close approach.

According to the direction of the rotation of the worm, the thrust on the engaging member 11 varies from one side of the thread to the other so that with close fitting, member 11 would rotate on one wall of the thread and drag on the other, but this may be relieved by permitting the member to be displaced somewhat radially, so that in operation it does not truly fit into the thread and, therefore, has clearance in that wall which is not effecting the driving of the member. This relief may be obtained by providing for slight end play in the shaft 5 and resisting this end play by means of a spring 14 located within the shaft, which is chambered for that purpose at 15, the said spring being disposed between the inner end wall of the said chamber 15 and plunger 16, the head of which engages a ball 17 rolling on a pad 18 of suitable bearing metal located in the cover plate 19 of the gear casing. Thus, thrust of the spring 14 is transmitted through a shaft 5 and its arm 8 to the worm engaging member 11 forcing it into the thread of the worm 2, but the required relief movement of the member 11, heretofore referred to, may take place against the resistance of the said spring 14 due to the fact that the end of the drive shaft 5 is slightly spaced at 20 from the pad 18. Normally member 11 fully provides in the bed of the thread 12 and there is no looseness or rattle resulting from the provision of the relief movement referred to.

Figure 4:
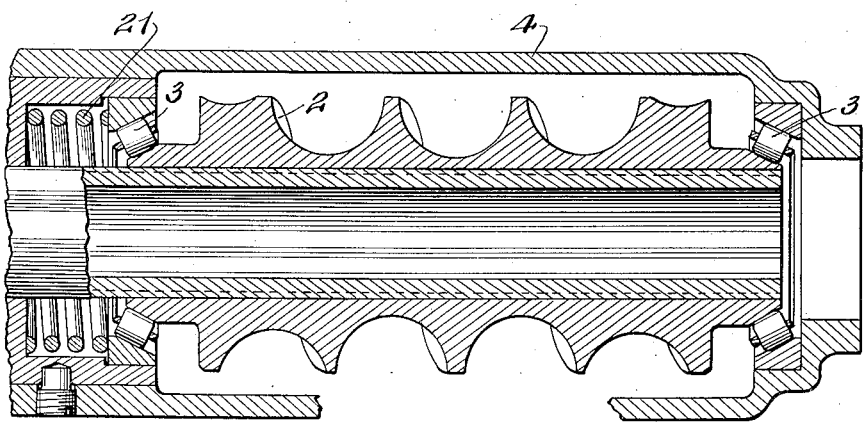
Figure 4 is a longitudinal section through the steering column showing a modified mounting of the worm thereon.
Figure 3:
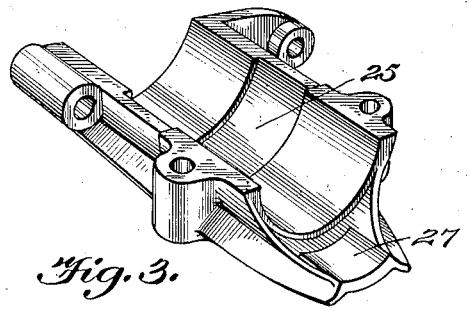
Figure 3 is a perspective detail view of the shoe or cradle in which the gear assembly is mounted for use.

The said spring 14 serves a further and important object in that, it provides for the taking up of wear in the worm should such occur from long use or from other causes, and also serves to absorb road shocks or vibration transmitted to the worm. In this connection attention is called to modification of Figure 4, wherein springs 21 are shown as exerting an opposed end pressure through the bearings 3 on the worm 2 as the means of absorbing such road shocks and vibrations. This latter arrangement may be used in addition to the arrangement of the spring 14 already described to provide what may be termed a full floating gear, or, of course, it may be used independent thereof for the performance of its functions.

The cover plate 19 serves to form a closure for any open face of the enlarged end of the casing in which the drive shaft is located, and upon its removal permits the drive shaft 5 to be inserted into or removed from the casing through the open end of the enlarged portion so that the gear can be readily assembled and disassembled, and the said closure is also effected in maintaining the drive shaft and its arm in position relative to the worm.

That part of the casing in which the drive shaft extends and in which is included the bearing 6 is provided with cylindrical portions 23 and 24 forming bearing surfaces adapted to seat in a cradle or shoe 25, which may be mounted on the frame 26 of a vehicle, the said shoe being further extended by a pad 27 beneath the enlarged portion of the casing to further support the same. The said trunnion is held on the said shoe by a cap 29 arranged intermediate of the portion 23 of the casing and pad 27 of the shoe whereby an extended support is provided for the casing therebeneath, which in combination with the upper support afforded by the cap 29 forms what may be regarded as a three-point support, which is very efficient in maintaining the drive shaft against regular angular displacement in use.

The bearing 7 of the casing and the worm 2 may have reinforced support by the provision of fins 28 on the casing about the said bearing 7 so that extreme rigidity at this point may be secured with a minimum structure in weight.

The simple and robust nature of the arrangement described will be readily apparent, as will be the fact that its smoothness of operation is not dependent upon temperature conditions such as affect gears wherein a number of gears are engaged by a sector or nut, and the rolling contact between the worm and its engaging member still further ensures a ready response of the arm to the operation of the worm.

Figure 5:
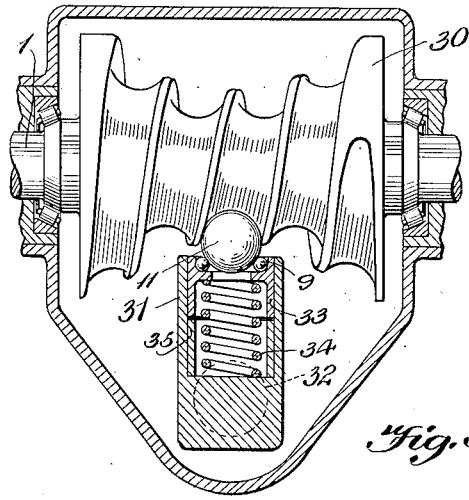
Figure 5 is a similar and somewhat diagrammatic view to Figure 1, illustrating a modified arrangement of the invention.
Figure 6:
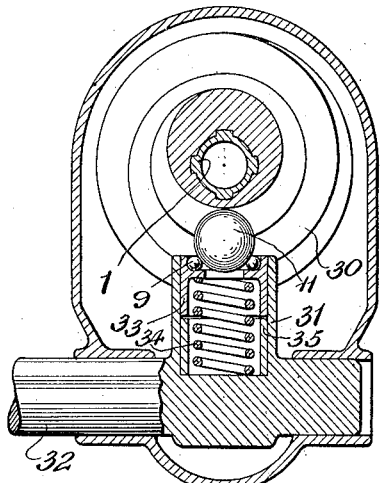
Figure 6 is a transverse section of the same.

Although the described arrangement is preferred especially in an automobile steering gear, certain characteristic principles may be provided in different arrangements such, for instance, as that shown in Figures 5 and 6, wherein the worm 30 of the driving shaft 1 has a helicoidal thread in counterpart of the path of the worm engaging member 11 carried by an arm 31 of the driven shaft 32, the arm in this case swinging in a plane which passes through the axis of the thread worm 30 instead of in a plane parallel thereto as in the previously described arrangement. The movement of the worm engaging member 11 towards and from the axis of the worm is in this case much more pronounced than in the said previously described arrangement and the diametral variation of the thread is similarly more pronounced.

In the said Figures 5 and 6 another method of effecting the urging of the worm engaging member 11 in the direction of the axis of the worm is illustrated, the race of the ball bearing 9 being formed in a plunger 33 axially movable in the said arm and subjected to the pressure of a spring 34 within the arm, 35 being the stop within the arm limiting the inward movement of the plunger 33 and consequently determining the relief movement of the worm engaging member 11.

This invention may be developed within the scope of the following claims without departing from the essential features of the said invention, and it is desired that the specification and drawings be read as being merely illustrative and not in a limiting sense, except as necessitated by the prior art.

What I claim as new is:—

1. In a device of the class described, a rotary driving shaft having a worm thereon, a transverse driven shaft having an arm thereon, and a ball rotatably mounted in a non-friction bearing in said arm and engaging said worm.

2. In a device of the class described, a rotary driving shaft having a worm thereon, a transverse driven shaft having an arm thereon, said arm being provided with a ball race, a series of balls mounted in said race, and a ball rotatably carried by said series of balls and engaging said worm.

3. In a device of the class described, a rotary driving shaft having a worm thereon, a transverse driven shaft having an arm thereon, a worm engaging member carried by said arm and swingable therewith toward the axis of said worm as said arm approaches the intermediate position of its swing, the depth of the thread of said worm decreasing from the center toward the ends thereof in counter-part of the path of said member relative to the axis of said worm.

4. In a device of the class described, a rotary driving shaft having a worm thereon, a transverse driven shaft having an arm thereon, and a worm engaging member carried by said arm, said member being rotatable in said arm in more than one direction and movable with said arm toward and from the axis of said worm, the thread of said worm varying in depth in counter-part of the path of said engaging member.

5. In a device of the class described, a rotary driving shaft having a worm thereon, a transverse driven shaft having an arm thereon, and a ball rotatably mounted in said arm and engaging said worm, said ball being movable with said arm towards and from the axis of said worm, the thread of said worm varying in depth in counter-part of the path of said ball.

6. In a device of the class described, a rotary driving shaft having a worm thereon, a transverse driven shaft having an arm thereon, a member on said arm engaging said worm, and slightly yieldable means maintaining the engagement of said member with said worm said yieldable means being rotatably supported.

7. In device of the class described, a rotary driving shaft having a worm thereon, a transverse driven shaft having an arm thereon, said driven shaft having slight end play, a member on said arm engaging said worm, and yieldable means acting on said shaft to press said arm in the direction of said worm said yieldable means being mounted for rotation with said shaft.

8. In a device of the class described, a rotary driving shaft having a worm thereon, a transverse driven shaft having an arm thereon, a member on said arm engaging said worm, said member being rotatable in more than one direction, and slightly yieldable means urging said member in the direction of said worm said yieldable means being rotatably supported.

9. In a device of the class described, a rotary driving shaft having a worm thereon, a transverse driven shaft having an arm thereon, a worm engaging member carried by said arm and movable therewith towards and from the axis of said worm, the thread of said worm varying in depth in counterpart of the path of said engaging member, and slightly yielding means urging said member in the direction of said worm said yieldable means being rotatably supported.

10. In a device of the class described, a rotary driving shaft having a worm thereon, a transverse driven shaft having an arm thereon, a worm engaging member carried by said arm and movable therewith towards and from the axis of said worm, said member being rotatable in more than one direction on said arm, the thread of said worm varying in depth in counter-part of the path of said member, and slightly yieldable rotatably mounted means urging said member in the direction of said worm.

11. In a device of the class described, a rotary driving shaft having a worm thereon, a transverse driven shaft having an arm thereon, a member on said arm engaging said worm, means for yieldably urging said member towards said worm a casing having an enlarged end portion in which said driving shaft is located, said end portion having an opening through which said driven shaft is inserted into said casing, and a closure for said opening, said closure supporting said yieldable means and a replaceable pad carried by said closure for receiving all wear due to pressure of said yieldable means.

12. In a device of the class described, in combination, a casing, a driven shaft extending longitudinally through said casing, a driving shaft extending transversely through one end of said casing, a worm on said driving shaft, an arm on said driven shaft, a member on said arm engaging said worm, and a cradle for said casing, the lower part of said cradle extending beneath said worm.

13. In a device of the class described, a rotary driving shaft having a worm thereon, a transverse driven shaft having an arm thereon, a universally mounted member on said arm engaging said worm, and means for yieldingly urging said member toward said worm.

14. In a device of the class described, a rotary driving shaft having a worm thereon, a transverse driven shaft having an arm thereon, a ball rotatably mounted in said arm for engagement with said worm and means for yieldingly urging said ball toward said worm.

15. In a device of the class described, a rotary driving shaft having a worm thereon, a transverse shaft having an arm thereon, a ball mounted in said arm for engagement with said worm and a recess in said worm for spacing said ball and the root of the threads of said worm.

16. In a device of the class described, a rotary driving shaft having a worm thereon, a transverse shaft having an arm thereon, a ball rotatably carried by said arm for engaging said worm, means for yieldingly urging said ball toward said worm and means for maintaining said ball and the root of the threads of said worm in spaced relation.

17. In a device of the class described, a rotary drive shaft having a worm thereon, a transverse shaft having a hollowed out portion extending longitudinally thereof, an arm on said shaft, a rotatable member carried by said arm for engaging said worm, and yielding means mounted within the hollowed out portion of said shaft for urging said rotatable member toward said worm.

18. In a device of the class described, a rotary drive shaft having a worm thereon, a transverse shaft having a hollowed out portion extending longitudinally thereof, an arm on said shaft, a rotatable member carried by said arm for engaging said worm, a plunger slidably fitted in said hollowed out portion, an abutment for said plunger and yielding means between said plunger and the base of said hollowed out portion whereby said engaging member is urged toward said worm.

19. In a device of the class described, a casing, a rotary drive shaft having a worm thereon within said casing, a transverse shaft having a hollowed out portion extending longitudinally thereof, an arm on said shaft, a rotatable member carried by said arm for engaging said worm, a plunger slidably fitted within hollowed out portion, a rotatable abutment between said casing and said plunger and yielding means between said plunger and base of said hollowed out portion for urging said rotatable member toward said worm.

20. In a device of the class described, a rotary drive shaft having a worm thereon, a transverse shaft having a hollowed out portion extending longitudinally thereof, an arm on said shaft, a rotatable member carried by said arm for engaging said worm, a plunger in said hollowed out portion, aligning means for said plunger and yielding means between said plunger and the base of said hollowed portion for urging said rotatable member toward said worm.

21. In a device of the class described, a rotary drive shaft having a worm thereon, a transverse shaft having a hollowed out portion extending longitudinally thereof, an arm on said shaft, a rotatable member carried by said arm for engaging said worm, a plunger having a reduced axially extending end slidable in a reduced end portion of said hollowed out portion whereby said plunger is maintained in axial alignment, an abutment for said plunger and yielding means between said plunger and the base of said hollowed out portion whereby said rotatable member is urged toward said worm.

22. In a device of the class described, a rotary drive shaft having a worm thereon, a transverse shaft having a hollowed portion extending longitudinally thereof, an arm on said shaft, a rotatable member carried by said arm for engaging said worm, a plunger having a reduced axial end, said end slidably fitting in a reduced cylindrical end portion of said hollowed out portion, a spring adjacent said reduced end and abutting said plunger and said shaft whereby said plunger and shaft are urged apart and an abutment resisting displacement of said plunger whereby said rotatable member is urged toward said worm.

23. The combination as set forth in claim 22 wherein said abutment comprises a metallic ball.

24. In a device of the class described, a casing, a rotary drive shaft having a worm thereon mounted in said casing, a transverse shaft extending into said casing having a hollowed out portion extending longitudinally thereof, an arm on said shaft, a rotatable member carried by said arm for engaging said worm, a closure for said casing, a plunger slidably fitted in said hollowed out portion, yielding means between said hollowed out portion for urging said rotatable member toward said worm and a ball between said closure and said plunger resisting displacement of said plunger.

In testimony whereof I affix my signature.

WARREN NOBLE.